United States Patent
Nakabe

(10) Patent No.: US 7,152,799 B2
(45) Date of Patent: Dec. 26, 2006

(54) CONTACTLESS IC CARD

(75) Inventor: Futoshi Nakabe, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/517,056

(22) PCT Filed: Nov. 17, 2003

(86) PCT No.: PCT/JP03/14607

§ 371 (c)(1),
(2), (4) Date: Jul. 25, 2005

(87) PCT Pub. No.: WO2004/047003

PCT Pub. Date: Jun. 3, 2004

(65) Prior Publication Data

US 2006/0163365 A1    Jul. 27, 2006

(30) Foreign Application Priority Data

Nov. 19, 2002  (JP)  ............................. 2002-335659

(51) Int. Cl.
*G06K 19/00*  (2006.01)

(52) U.S. Cl. ...................... 235/487; 235/376; 235/451; 235/492

(58) Field of Classification Search ................ 235/487, 235/492, 435, 376, 451; 708/250, 255
See application file for complete search history.

(56) References Cited

U.S. PATENT DOCUMENTS

| | | | | |
|---|---|---|---|---|
| 5,068,894 A * | 11/1991 | Hoppe | .................. | 713/172 |
| 5,293,029 A * | 3/1994 | Iijima | .................. | 235/380 |
| 6,040,786 A | 3/2000 | Fujioka | | |
| 6,480,869 B1 * | 11/2002 | Fujioka | .................. | 708/252 |
| 7,011,250 B1 * | 3/2006 | Nakabe et al. | .................. | 235/487 |
| 7,016,924 B1 * | 3/2006 | Nakabe et al. | .................. | 708/250 |

FOREIGN PATENT DOCUMENTS

EP    1 197 909 A1    4/2002

* cited by examiner

*Primary Examiner*—Kimberly D. Nguyen
(74) *Attorney, Agent, or Firm*—McDermott Will & Emery LLP

(57) ABSTRACT

A contactless IC card comprises a plurality of random number generation units that are separate from applications to be executed and operable independently to generate a random number for setting a card slot. A random number generation instruction unit designates the random number generation unit to be used for a response from a request from among the plurality of random number generation units. The random number generated by the designated generation unit is used by a slot setting unit to perform a response.

8 Claims, 11 Drawing Sheets

FIG.6

| APPLICATION NAME | RANDOM-NUMBER-GENERATION UNIT |
|---|---|
| LONG-TERM COMMUTER PASS | RANDOM-NUMBER-GENERATION UNIT 1 |
| NORMAL TICKET | RANDOM-NUMBER-GENERATION UNIT 2 |
| MEDICAL FACILITY A | RANDOM-NUMBER-GENERATION UNIT 3 |
| MEDICAL FACILITY B | RANDOM-NUMBER-GENERATION UNIT 4 |
| PUBLIC OFFICE | RANDOM-NUMBER-GENERATION UNIT 5 |
| EMPLOYEE CAFETERIA | RANDOM-NUMBER-GENERATION UNIT 6 |

CONTACTLESS IC CARD

TECHNICAL FIELD

This invention relates to a contactless IC card for a system that identifies a plurality of contactless IC cards.

BACKGROUND ART

Conventionally, a time-slot method is used in the communication between a contactless IC card that receives data using an electromagnetic induction method and the reader/writer that identifies that contactless IC card. This is done in order to solve the problem of some contactless IC cards not being able to perform communication with the reader/writer when there is a plurality of contactless IC cards in the communication area of the reader/writer at the same time, and when this plurality of contactless IC cards send response signals in response to polling from the reader/writer and these response signals collide with each other.

The time-slot communication method will be explained below.

(1) In order to check the existence of a contactless IC card, the reader/writer sends an initial-response request to the contactless IC card. The initial-response request contains the number of time slots in which the contactless IC card can make an initial response, or in other words the 'Number of Slots'.

(2) After the contactless IC card receives the initial-response request, it returns an initial response in a time slot that starts from a specified time (1 to 'Number of Slots': hereafter, called the slot). The response slot is set by the contactless IC card itself.

(3) When the reader/writer detects a collision of the initial response from the contactless IC card, it sends the initial-response request to the contactless IC card again to restart the ID process of the time-slot method for the contactless IC card.

(4) When the reader/writer does not detect any collisions of initial responses from the contactless IC cards in any of the slots, it is then possible to identify all of the contactless IC cards, and it completes the ID process sequence.

Also, there is a slot-marker method in which the reader/writer sends a notification of the response timing. The slot-marker method is a method in which the reader/writer sends a slot-marker command to indicate the start of the slot in start timing of each slot after the reader/writer sends the initial-response request in the time-slot method. The method in which the IC card uses random numbers to set the response slot is the same.

A wireless ID apparatus has been disclosed as this kind of system (Japanese unexamined patent publication No. 9-6934: document 1).

Also, a contactless IC card ID method has been disclosed in the contactless IC card ID system and ID method of Japanese unexamined patent publication No. 11-205334 (document 2).

However, in the wireless ID apparatus (in document 1), the slots for sending response signals are set by random numbers and do not depend on the contactless IC cards. Therefore, when a plurality of contactless IC cards generate the same random number, there will be collisions of initial responses. In that case, it is necessary for the reader/writer to send the initial-response request command again and start again the process for setting the time slots, so there is a delay for the reader/writer to identify the IC cards.

Also, in the contactless IC card ID system and ID method (in document 2), a response is made to the first request after the power has been turned ON using slot number 1, or in other words, the first time slot, and from the second request on, the slot numbers for the responses are set using random numbers as in the case of the wireless ID apparatus (in document 1).

In this case as well, when identifying a plurality of contactless IC card, there is always a collision in the first request. Therefore, similarly, the reader/writer must send the initial-response request command again and start again the process for setting the time slots, so there is a delay for the reader/writer to identify the IC cards.

DISCLOSURE OF INVENTION

The object of this invention is to prevent delays in identifying contactless IC cards by a reader/writer when there is a plurality of contactless IC cards in the communication area of the reader/writer, or in other words, to prevent collisions between initial responses when the contactless IC cards perform an initial response.

This invention premises a contactless IC card that is capable of executing a plurality of applications, and that responds to a request from a reader/writer by using a slot that is set by a random number. Here, there is a plurality of random-number-generation units that are separate from the applications, and they each generate a random number for setting a slot independently from the other random-number-generation units, and a random-number-generation-instruction unit designates which of the plurality of random-number-generation units to be used for a response to the request. A slot-setting unit uses the random number generated by the random-number-generation unit designated by the random-number-generation-instruction unit to respond to the request from the reader/writer.

Also, construction can be such that the random-number-generation-instruction unit designates the random-number-generation unit to use when responding to a request based on an application that is set from among the plurality of applications stored on the contactless IC card that is set by specified data.

Moreover, construction can be such that the random-number-generation-instruction unit can change the designation of the random-number-generation unit based on an instruction from the reader/writer.

Furthermore, construction can be such that there is a random-number-generation-data-acquisition unit that acquires random-number-generation data that is contained in the request to designate the random-number-generation unit, and where the slot-setting unit acquires a random number by using the random-number-generation unit that is designated by that random-number-generation data, and performs a response using that random number.

In the construction described above, it can be such that the random-number-generation data can designate an application stored on the contactless IC card, and the slot-setting unit can acquire a random number by using a function provided in the application designated by the random-number-generation data and respond to a request using that random number.

Also, construction can be such that the contactless IC card downloads an application comprises the random-number-generation unit.

Moreover, construction can be such that there is a switch for physically selecting among a plurality of random-number-generation units, and where the slot-setting unit selects a random-number-generation unit based on the switch state, and responds to a request using the random number generated by that random-number-generation unit.

Furthermore, construction can be such that there is a random-number-generation-notification unit that stores data, indicating the random-number-generation unit used for the response, in that response, and where the slot-setting unit sends the response in which that data is stored to the reader/writer.

[Effect of the Invention]

This invention comprises a plurality of random-number-generation units, and a slot-setting unit uses the random-number-generation unit designated by a random-number-generation-instruction unit to respond to a request, so it is possible to select an algorithm for setting different slots in contactless IC card units. Therefore, it becomes possible to respond to requests with a different slot even though the same kind of contactless IC card is used, and as a result, it is possible to lower the possibility of collisions between responses.

Also, by having the random-number-generation-instruction unit designate the random-number-generation unit to be used in responding to a request based on a default application, and in the case where there is a plurality of applications, it is possible to freely change the random-number-generation unit according to that application. Therefore, it is possible to respond to requests with a different slot according to the stored application even though the same kind of contactless IC cards is used, and as a result it is possible to lower the possibility of collisions between responses.

In the case where it is possible for the random-number-generation-instruction unit to change the contents of the stored designations from the outside, for example, by a command from the reader/writer, it becomes possible for the user to freely set the random-number-generation unit to be used from among a plurality of random-number-generation units.

Also, by having the random-generation-notification unit send which random-number-generation unit was used by the contactless IC card, or in other words, the type of application that is being operated, it becomes possible for the reader/writer to identify which application the identified contactless IC card is operating. Therefore, when the application is an application that can be sufficiently identified by the reader/writer, it is possible to end the anti-collision process early regardless of whether or not it is possible to identify other contactless IC cards. Instead of storing data indicating the random-number-generation unit, it is possible to store data indicating the application being operated in the highest-order byte of the APP Data. By doing so, the reader/writer is able to identify the application operated by the contactless IC card directly instead of from the random-number-generation unit. Also, from the response to the initial-response request, the reader/writer is able to identify the type of application operated by the contactless IC card or the random-number-generation unit. That is, by analyzing type data for the contactless IC card, it is possible for the host to know which kind of contactless IC cards are frequently identified, and as a result, it becomes possible to perform measures for preventing collisions between responses to a request.

Also, by having the contactless IC card judge the random-number-generation data contained in the initial-response request, it becomes possible for the reader/writer to designate the random-number-generation unit, or in other words, to designate the method of generating the random number.

In this way, it is possible for the external host program (reader/writer) to have the contactless IC card perform the desired random-number generation, so a different slot can be set for each contactless IC card, and thus it is possible to prevent collisions between responses to a request.

Also, the random-number-generation data designates an application, and by having the random-number-generation-data-acquisition unit acquire that random-number-generation data, it is possible for the reader/writer to generate unique random numbers for the applications on the contactless IC card, and to select different slots for each application. Therefore, as in the case of the long-term commuter-pass and normal ticket contactless IC cards described above, by identifying one of the contactless IC cards, it is not necessary to identify the other cards, so it is possible to end early the process for identifying the contactless IC cards.

Moreover, in the case of a switch for physically selecting from among a plurality of random-number-generation units, it is possible for the user of the contactless IC card to select the method for acquiring the random number by a switch from the outside, so it is possible to select a method for generating the random number that is suitable to the conditions for using the contactless IC card, and thus it is possible to prevent collisions between responses to a request.

BRIEF DESCRIPTION OF DRAWINGS

FIG. 6 is a drawing showing one example of the application/random number correspondence data stored by the random-number-generation-instruction unit.

BEST MODE FOR CARRYING OUT THE INVENTION

The preferred embodiments in which the present invention is applied to the international standard ISO/IEC14443 for proximity-type contactless IC cards are explained.

Figure 1:
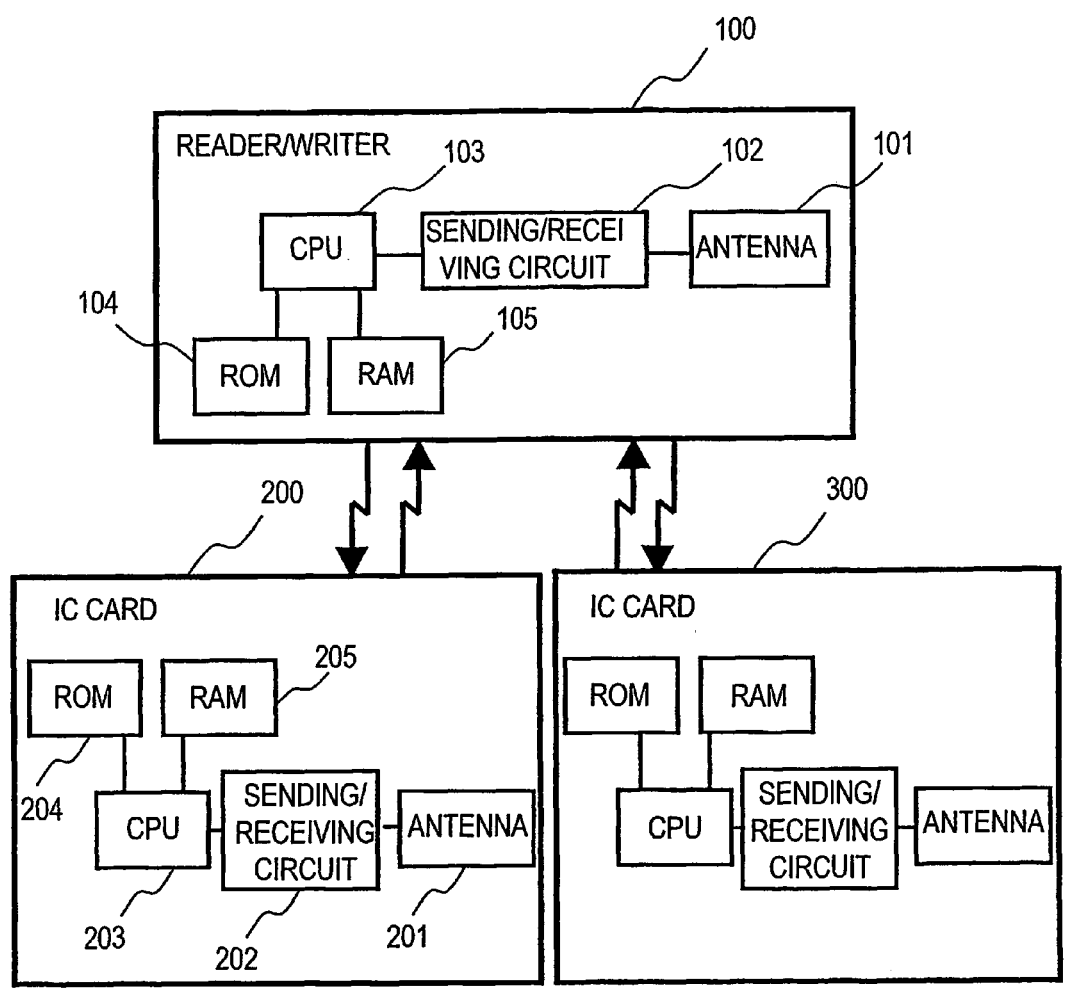
FIG. 1 is a drawing showing the construction of the reader/writer and contactless IC card of this invention.

FIG. 1 is a drawing showing the construction of the reader/writer 100 and the contactless IC card 200. The reader/writer 100 comprises: an antenna 101, sending/receiving circuit 102, CPU (Central Processing Unit) 103, ROM (Read Only Memory) 104 that stores a program for controlling the reader/writer 100, and RAM (Random Access Memory) 105 that is used as a work area, for example, when executing the program.

The contactless IC card 200 comprises: an antenna 201, sending/receiving circuit 202, CPU 203, ROM 204 that stores a control program for processing commands from the reader/writer 100, and RAM 205 that is used as a work area, for example, when executing the program.

The ISO/IEC14443 standard can be applied to a ticket gate of a public transport, for example. More particularly, as shown in FIG. 1, a contactless IC card 200 and contactless IC card 300, that function as a commuter-pass card (or ticket), are brought close to the reader/writer 100, which functions as a ticket gate, at the same time.

In the identification system for an ISO/IEC14443 contactless IC card, the contactless IC cards are identified by the procedure described below.

Figure 3:
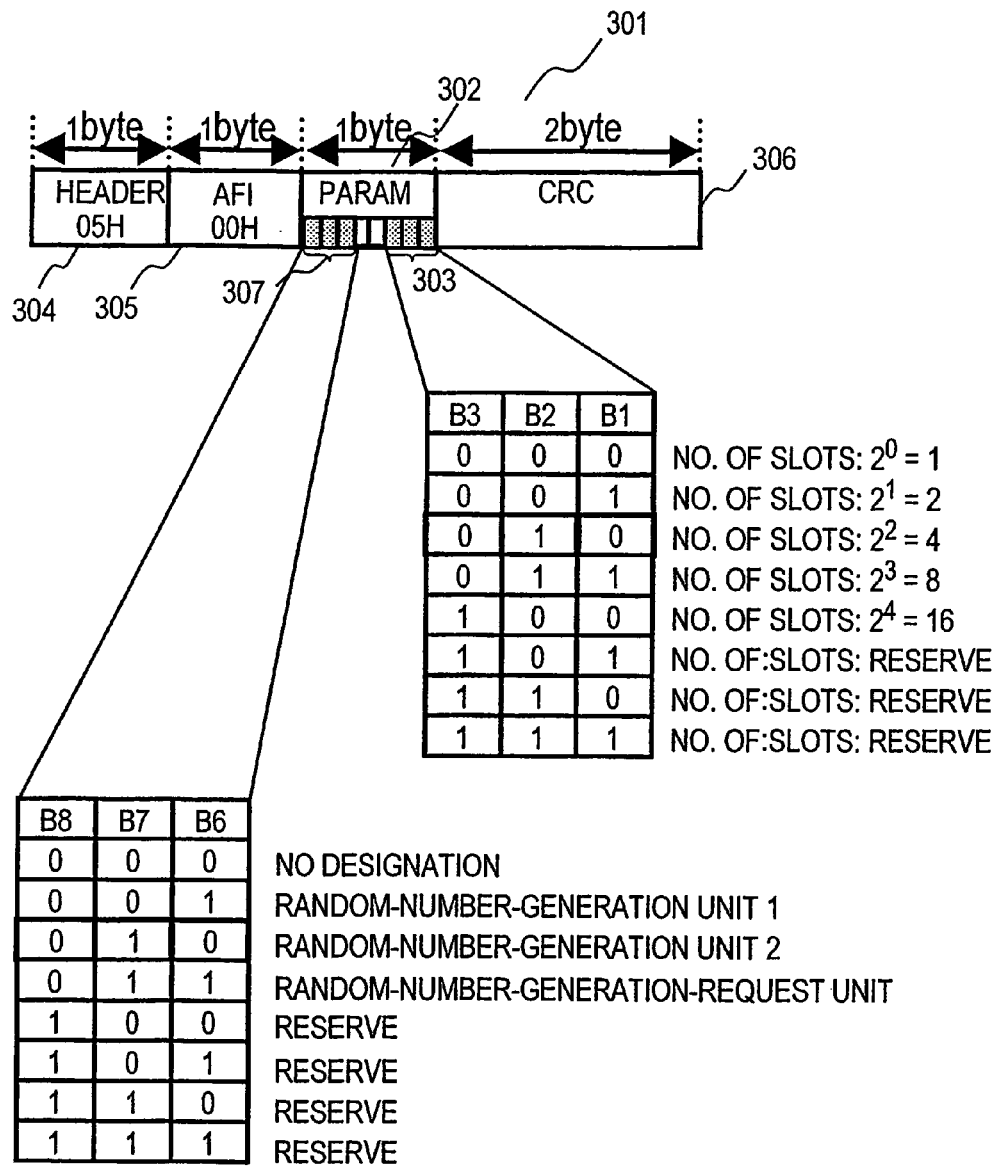
FIG. 3 is a drawing showing the format of the initial-response request of this invention.

First, the reader/writer 100, which is the ticket gate, sends an initial-response request. The format of the initial-response request is as shown in FIG. 3, and it notifies the contactless IC cards of the number of slots (N), indicated by the three bits 303 (bit 1 to bit 3) of PARAM 302 of the initial-response request 301. The contactless IC card responds with a slot number 1 to N. The header 304 is a header indicating an initial-response request, and AFI 305 indicates the adaptation class of the contactless IC card. Also, CRC (Cyclic Redundancy Check) 306 is a CRC from the header 304 to PARAM 302.

In the present explanation, the number of slots (N) will be four. That is, in response to the initial-response request, each of the contactless IC cards 200 and 300 selects a slot from 1 to 4 and sends an initial response.

In the present invention, the three bits 307 (bit 6 to bit 8) of PARAM 302 are data for notifying the contactless IC cards of random-number-generation data from the reader/writer 100. When that data does not designate the random-number-generation unit or the generation method for random numbers, the contactless IC cards are notified that the values for bit 6 to bit 8 are '0', and this will be explained in more detail later.

Figure 4:
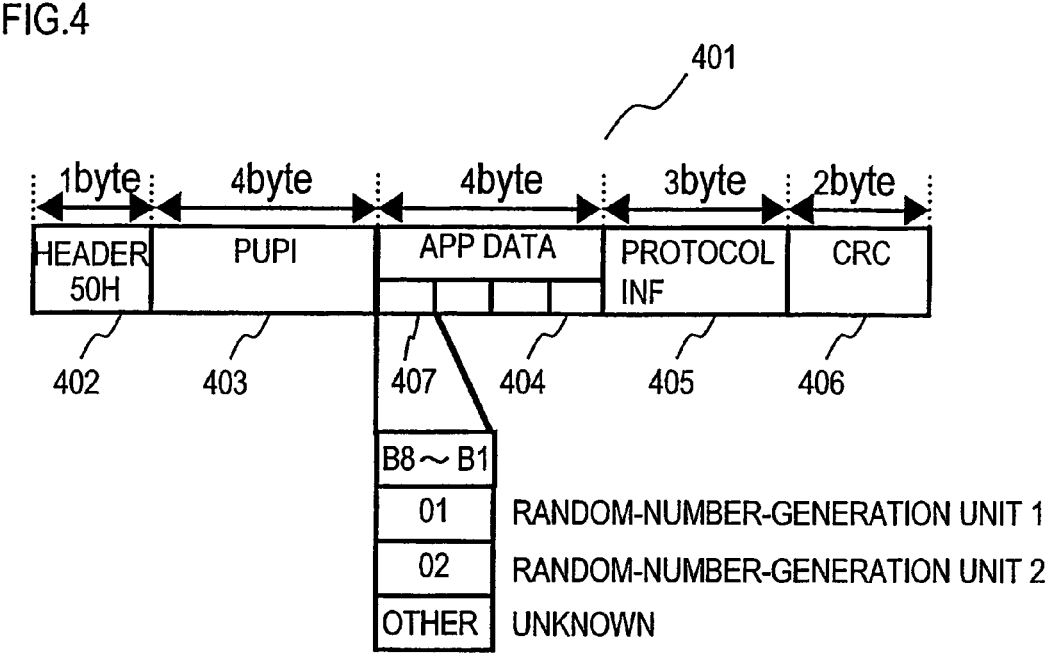
FIG. 4 is a drawing showing the format of the initial response of this invention.

The initial response 401 has the format as shown in FIG. 4, and the contactless IC cards 200, 300 set the card ID 403 for identifying the card (PUPI: Pseudo-Unique PICC Identifier), APP Data 404 for notifying of the application data on the card, and Protocol Inf 405 for notifying the reader/writer 100 of the protocol data, and sends these data as a response to the reader/writer 100. The header 402 indicates that the data is an initial response, and CRC 406 is a CRC from the header 402 to the Protocol Inf 405.

The reader/writer 100 receives the initial response from the contactless IC cards 200 and 300, and by calculating the CRC value of the received initial response and comparing it with the value stored in the initial response, determines whether or not a collision will occur. When the comparison result is a match, a collision will not occur, however if the result is not a match, it is possible to determine that there will be a collision.

In this invention, of the four bytes of the APP Data 404, the highest-order byte 407 is used for notifying of the method for generating the random numbers. However, of course, as the PUPI, it is also possible to include the number for the random-number-generation method in the highest-order byte of the card ID 403 (PUPI) and not just in the APP Data 404. In a word, the notification method can be defined by the decision as the host.

Figure 2:
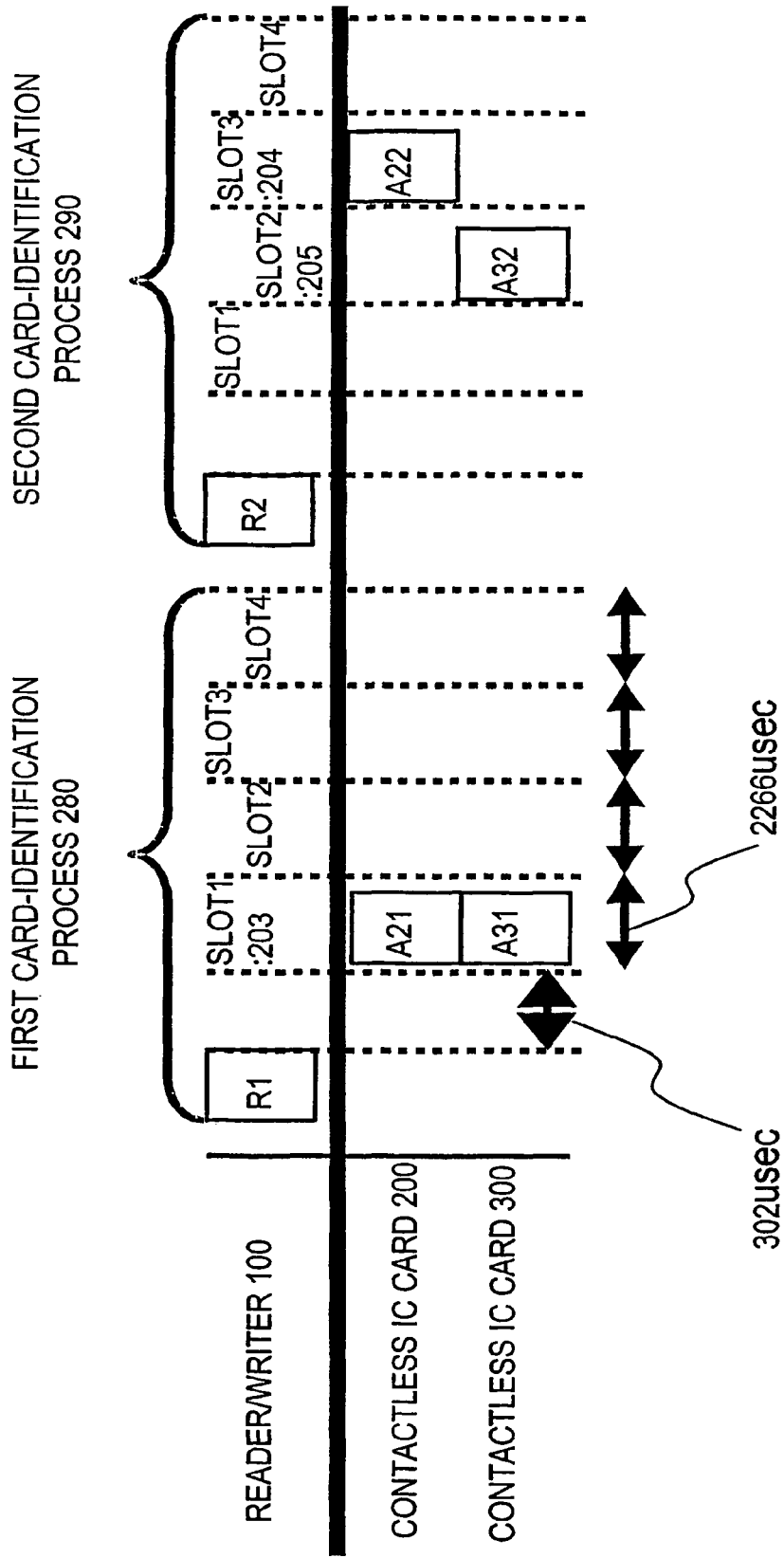
FIG. 2 is a time-chart showing the communication status between the reader/writer and contactless IC card.

In the time-chart shown in FIG. 2 that indicates the communication status between the reader/writer and contactless IC cards, in the first card-identification process 280, the reader/writer 100 sends an initial-response request R1. In response to the initial-response request, when both contactless IC card 200 and contactless IC card 300 generate '1' as the random number, they both respond using slot 1 (203). The initial responses are indicated as A21 and A31. In this case, the initial responses are sent using the same slot 1, or in other words, at the same timing, so the reader/writer 100 detects a collision between the initial responses. Therefore, the reader/writer 100 restarts the card identification process.

In the second card-identification process 290, the reader/writer 100 sends the initial-response request R2. In response to this initial-response request, when contactless IC card 200 and contactless IC card 300 respectively generate the random numbers '3' and '2', they send initial responses A22 and A32 using slot 3 (204) and slot 2 (205). In this case, the reader/writer 100 does not detect a collision, so it is possible to identify all of the contactless IC cards, and the identification process ends.

(First Embodiment)

Figure 5:
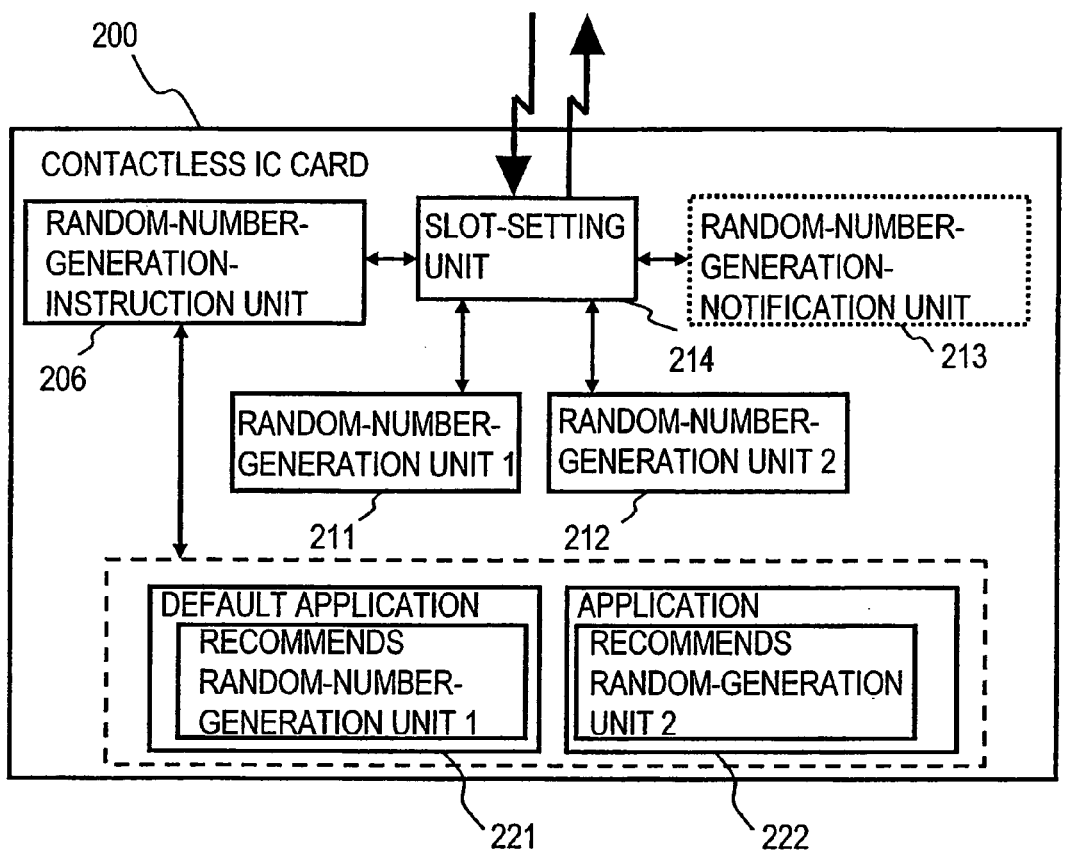
FIG. 5 is a block diagram of the functions of the contactless IC card of a first embodiment of this invention.

As shown in FIG. 5, the contactless IC card of a first embodiment of the invention comprises: random-number-generation unit 1 (211) and random-number-generation unit 2 (212) for generating random numbers; a random-number-generation-instruction unit 206 that contains data for designating which of these random-number-generation units 1 (211), 2 (212) to use; and a slot-setting unit 214 that uses the random number generated by the random-number-generation unit designated by the random-number-generation-instruction unit 206 to respond to the reader/writer. The random number referred to here is a random number that is used to set the slot for responding to a request when an initial-response request is sent from the reader/writer. The random-number-generation units mentioned above are located independently from the application stored on the contactless IC card. Independent means that the hardware, or software different from the application. Also, random-number-generation unit 1 (211) and random-number-generation unit 2 (212) operate independently to generate a random number.

Here, in considering the case of applying the invention to the ticket gate of a public transport, the contactless IC card 200 is a long-term-commuter-pass IC card, and the contactless IC card 300 is a normal ticket IC card, and the state when two IC cards pass through the ticket gate, which is the reader/writer 100 is verified.

Figure 7:
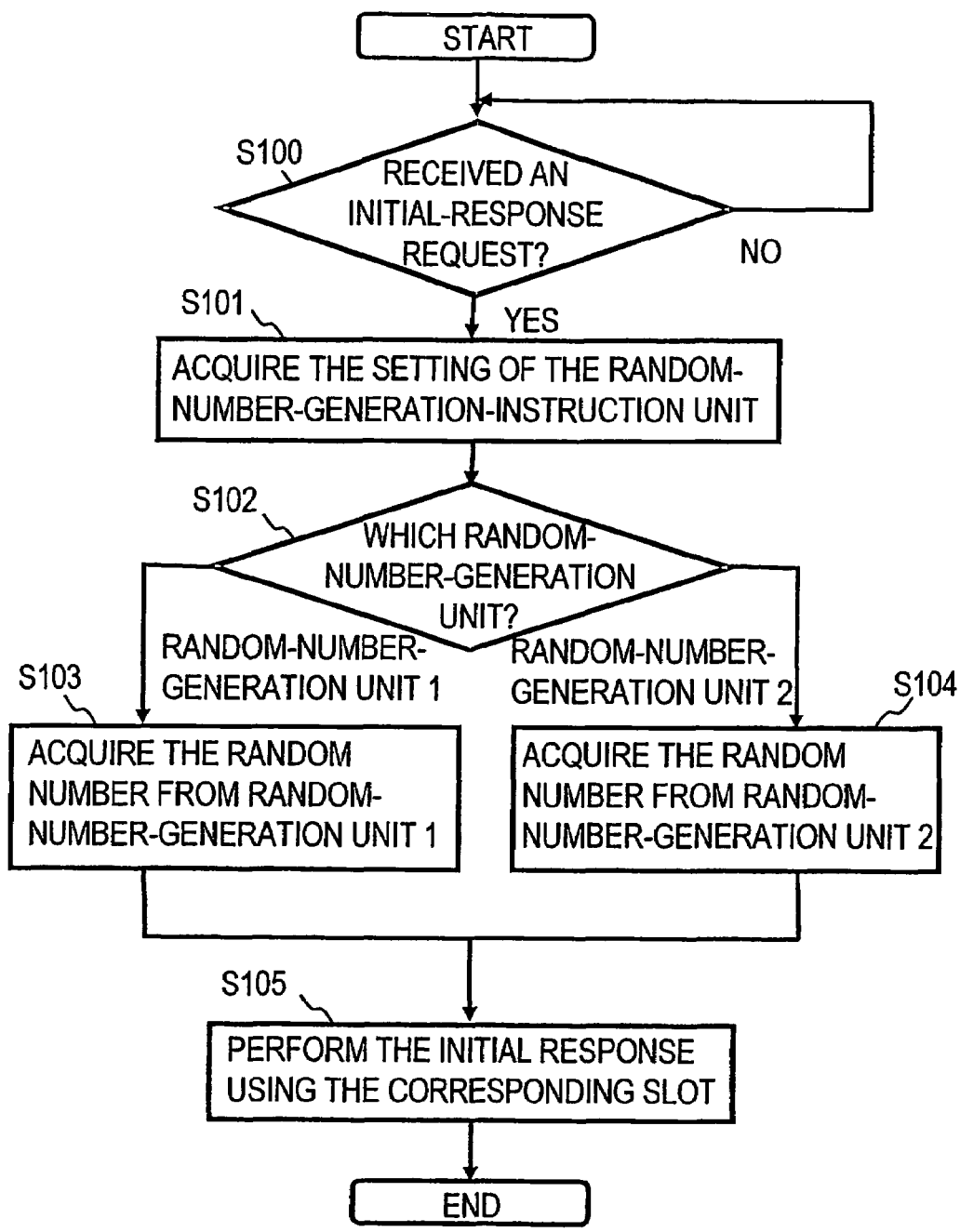
FIG. 7 is a flowchart showing the processing of the contactless IC card of a first embodiment of the invention.

FIG. 7 is a flowchart of the process that is executed when the contactless IC card 200 and contactless IC card 300 are applied to the public transport.

Here, the random-number-generation method used by the random-number-generation unit 1 (211) and the random-number-generation method used by the random-number-generation unit 2 (212) of contactless IC card 200 and contactless IC card 300 are performed respectively based on rule 1 and rule 2 described below.

Random-number-generation method for random-number-generation unit 1: Generates only '1'. (Rule 1)

Random-number-generation method for random-number-generation unit 2: Generates a random number from 2 to the number of slots, and does not generate a random number when the number of slots is 1. (Rule 2)

Also, there is a long-term-commuter-pass application 1 on contactless IC card 200, and a normal ticket application 2 on contactless IC card 300. Furthermore, setting 1 and setting 2 described below are contained in the random-number-generation-instruction unit 206 of contactless IC card 200 and contactless IC card 300, respectively.

Random-number-generation-instruction unit 206 for contactless IC card 200: Use random-number-generation unit 1. (Setting 1)

Random-number-generation-instruction unit 206 for contactless IC card 300: Use random-number-generation unit 2. (Setting 2)

Next, the flowchart shown in FIG. 7 will be used to explain the operation of contactless IC card 200 under these conditions.

Contactless IC Card 200, waits for the initial-response request to be sent from the reader/writer 200 (step S100: NO). When the initial-response request is received (step S100: YES), the slot-setting unit 214 calculates the number of slots according to the request (not shown in the figures). The number of slots is calculated based on the values specified by bit 1 to bit 3 of PARAM shown in FIG. 3. Two to the power of the value specified by these bits is the number of slots. The equation for calculating the number of slots (Equation 1) is given below.

$$\text{Number of slots (N)} = 2^n \qquad \text{(Equation 1)}$$

(n is a value from 0 to 4 that is expressed by bit 1 to bit 3.)

Here, the value of 'n' that is contained in the initial-response request is '1', or in other words, the calculated number of slots (N) is 2.

Next, after the number of slots has been calculated, the slot-setting unit 214 acquires the setting stored in the random-number-generation-instruction unit 206 (step S101). According to the conditions mentioned above, the acquired setting is setting 1, or in other words, 'random-number-generation unit 1'.

Next, the slot-setting unit 214 selects random-number-generation unit 1 based on the data stored in the random-number-generation-instruction unit 206 (step S102), and the random-number-generation unit 1 acquires a random number (step S103). Since random-number-generation unit 1 only generates the random number 1, contactless IC card 200 responds using slot 1 (step S105).

Next, the flowchart shown in FIG. 7 will be used to explain the operation of contactless IC card 300 that is performed at the same time as the operation of contactless IC card 200.

First, contactless IC card 300 waits for an initial-response request to be sent from the reader/writer 100 (step S100: NO). When the initial-response request is received (step S100: YES), the slot-setting unit 214 calculates the number of slots based on the request (Equation 1). The number of slots (N) is the same as in the case of contactless IC card 200, and so it is 2.

Next, the slot-setting unit 214 acquires the setting stored in the random-number-generation-instruction unit 206 from the random-number-generation-instruction unit 206 (step S101). According to the conditions described above, the acquired setting is setting 2, or in other words, 'random-number-generation unit 2'.

Next, contactless IC card 300 selects the random-number-generation unit 2 based on the data stored in the random-number-generation-instruction unit 206 (step S102), and acquires a random number from the random-number-generation unit 2 (step S104). In the case of random-number-generation unit 2, a random number between 2 and the number of slots is generated, or in this case a random number from 2 to 2 is generated, so the generated random number is 2, and as a result, contactless IC card 300 responds using slot 2 (step S105).

As a result of the process described above, in response to the request from the reader/writer 100 having two slots, contactless IC card 200 responds using slot number 1, and contactless IC card 300 responds using slot number 2, so in one anti-collision process, all of the contactless IC cards were identified and processing ends.

As described above, there is a plurality of random-number-generation units, and the slot-setting unit performs the response by using the random-number-generation unit that is designated by the random-number-generation-instruction unit, so it is possible to select an algorithm for setting different slots in units of contactless IC cards. Therefore, it is possible to respond to a request with a different slot even with the same kind of contactless IC card, and as a result it is possible to reduce the probability of collisions between responses.

In the case of a contactless IC card that corresponds to a plurality of applications, it is possible, for example, to distinguish the application as a default application 221, which is an application that is expected to be used frequently, from other applications 222. In other words, after a contactless IC card has been identified and in case no application has been specified from the reader/writer when the reader/writer is communicating with the contactless IC card, the default application 221 is operated for that contactless IC card.

In these conditions, the random-number-generation-instruction unit 206 can be such that it specifies the random-number-generation unit that the default application specifies.

In other words, the random-number-generation-instruction unit 206 reads the data for the random-number-generation unit that the default application recommends from that application, and stores that data as information of random-number-generation unit that random-number-generation-instruction unit 206 designates.

For example, as shown in FIG. 5, the random-number-generation unit that is recommended by the application 221 is random-number-generation unit 1 (211), and the random-number-generation unit that is recommended by the application 222 is random-number-generation unit 2 (212). In this case, when application 221 is set as the default application by a command from the outside, for example, the random-number-generation-instruction unit 206 stores random-number-generation unit 1 (211) according to the data set by the application 221.

By having the random-number-generation-instruction unit designates the random-number-generation unit to be used for responding based on the default application as described above, it becomes possible to freely change the random-number generation unit according to the application, when there is a plurality of applications stored. Therefore, different responses are possible according to the stored application even with the same kind of contactless IC card, and as a result it is possible to reduce the probability of collisions between responses.

It is also possible to change the designation contents stored by the random-number-generation-instruction unit from the outside, such as by a command from the reader/writer. In this way, it is possible for the user to arbitrarily set the random-number-generation unit to be used from among a plurality of random-number-generation units. This process can be used, for example, when a new application is installed on the contactless IC card, the destination designated by the random-number-generation-instruction unit is changed to the random-number-generation unit applied to that application.

Moreover, as another method for the random-number-generation-instruction unit 206 described above to designate the random-number-generation unit according to the default application, it is possible to have the random-number-generation-instruction unit 206 store application/random number-correspondence data, such as a table that relates the application to the random-number-generation unit. FIG. 6 shows an image of a table of application/random number-correspondence data.

As shown in FIG. 6, the application/random number-correspondence data 600 is stored as the correspondence between the application name 601 and random-number-generation unit 602, and the random-number-generation-instruction unit 206 references this application/random-number-correspondence data 600 and sets the corresponding random-number-generation unit 602 based on the application name 601 that is set as the current default application. For example, in the case where the default application is a normal ticket 603, the corresponding random-number-generation unit is random-number-generation unit 2 (604). Needless to say, this is not limited to the application name and could be the application ID, which will be described later. Also, the table described above is one example, and the construction could be anything that gives the relation between the application and the random-number-generation unit.

Next, the construction of a contactless IC card comprising a random-number-generation-notification unit 213 will be explained.

For example, the case of one long-term commuter-pass contactless IC card 200 and two normal ticket contactless IC cards 300, and contactless IC card 400 (not shown in the figures), having the same application as contactless IC card 300 will be considered.

In this case, as was described above, contactless IC card 200 uses slot number 1 to respond to a request from the reader/writer 100 having two slots, and contactless IC card 300 and contactless IC card 400 must respond using slot number 2. However, here, the random-number-generation-notification unit 213 stores the data indicating the random-generation unit to be used in the highest-order byte of the APP Data 407 of the initial response shown in FIG. 4, and responds to the request.

In the example described, the reader/writer 100 would have no problem in identifying the response from contactless IC card 200 that uses slot number 1, but would detect a collision between the responses from the other contactless IC cards 300, 400. In other words, only contactless IC card 200 is identified properly, so normally, the identification process is started again for all of the contactless IC cards. However, here, since the reader/writer 100 was able to identify contactless IC card 200, from the notification from the random-number-generation-notification unit 213, it is possible for the reader/writer to positively identify it as a long-term commuter pass. In this example, the long-term commuter-pass IC card, which should have priority over a normal ticket IC card, is identified so, ticket processing is possible.

As described above, the random-number-generation-notification unit sends a notification of the random-number-generation unit that is used by the contactless IC card, or in other words, also includes the type of application operated, so it is possible for the reader/writer to identify the application operated by the identified contactless IC card. Therefore, when the application is an application that can be sufficiently identified by the reader/writer, it is possible to end the anti-collision process regardless of whether or not it is possible to identify the other contactless IC cards.

Instead of storing data indicating the random-number-generation unit, it is possible to store data indicating a long-term commuter pass IC card in the highest-order byte of the APP Data 407. By doing so, the reader/writer is able to identify the application operated by the contactless IC card directly instead of from the random-number-generation unit.

Also, from the response to the initial-response request, the reader/writer is able to identify the type of application operated by the contactless IC card or the random-number-generation unit. That is, by analyzing type data for the contactless IC card, it is possible for the host to know which kind of contactless IC cards are frequently identified, and as a result, it becomes possible to perform measures for preventing collisions between responses to a request.

(Second Embodiment)

Figure 8:
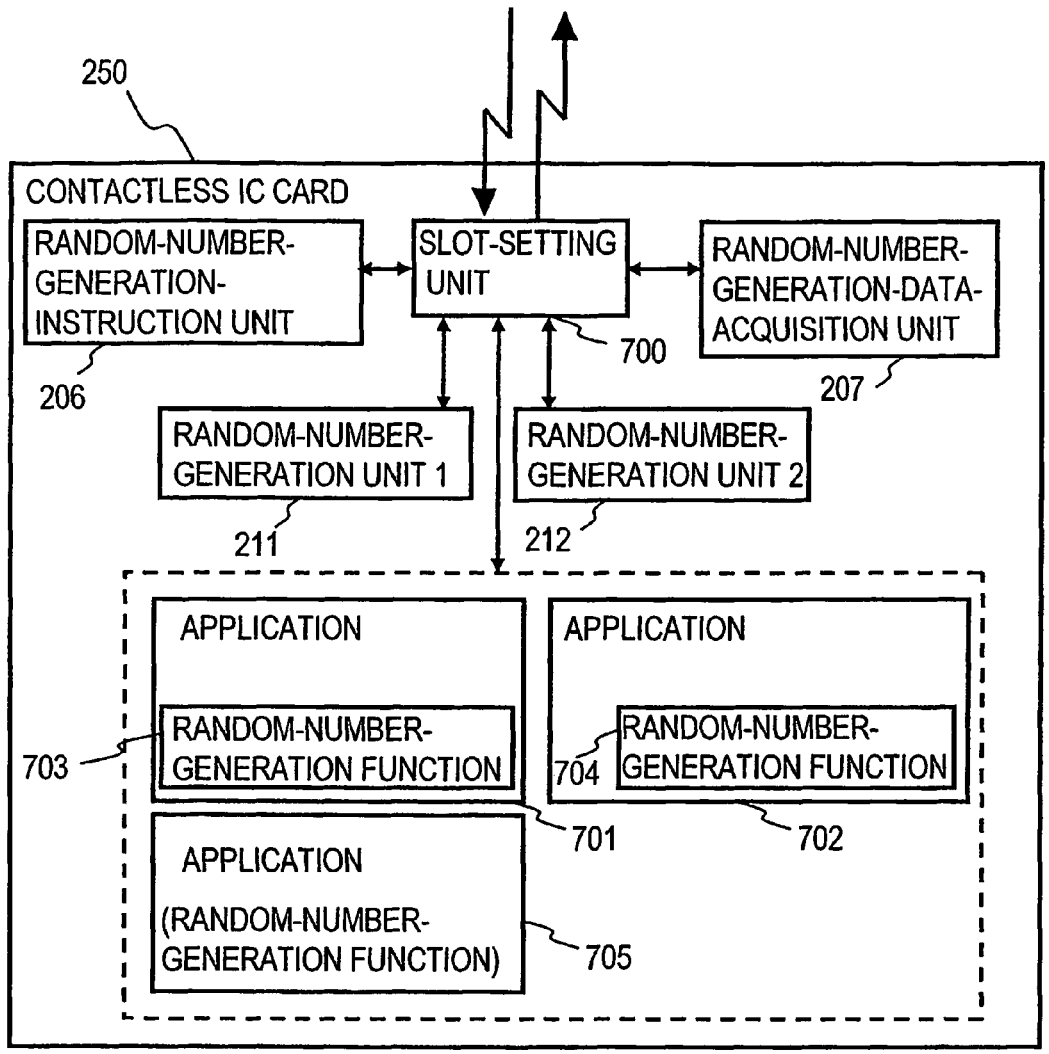
FIG. 8 is a block diagram of the functions of the contactless IC card of a second embodiment of the invention.

FIG. 8 is a block diagram of the functions of the contactless IC card 250 of a second embodiment of the invention. The reader/writer 100 is the same as the reader/writer described in the first embodiment so an explanation of it will be omitted here.

The contactless IC card 250 is constructed such that it has a random-number-generation-data-acquisition unit 207 in addition to the construction of the contactless IC card 200. The random-number-generation-data-acquisition unit 207 acquires random-number-generation data from the reader/writer and notifies the slot-setting unit of the contents of that data. The slot-setting unit requests the random-number-generation units 1, 2 or applications 701, 702, 705 on the contactless IC card 250 to generate a random number based on that notification, and this will be explained in more detail later.

Figure 9:
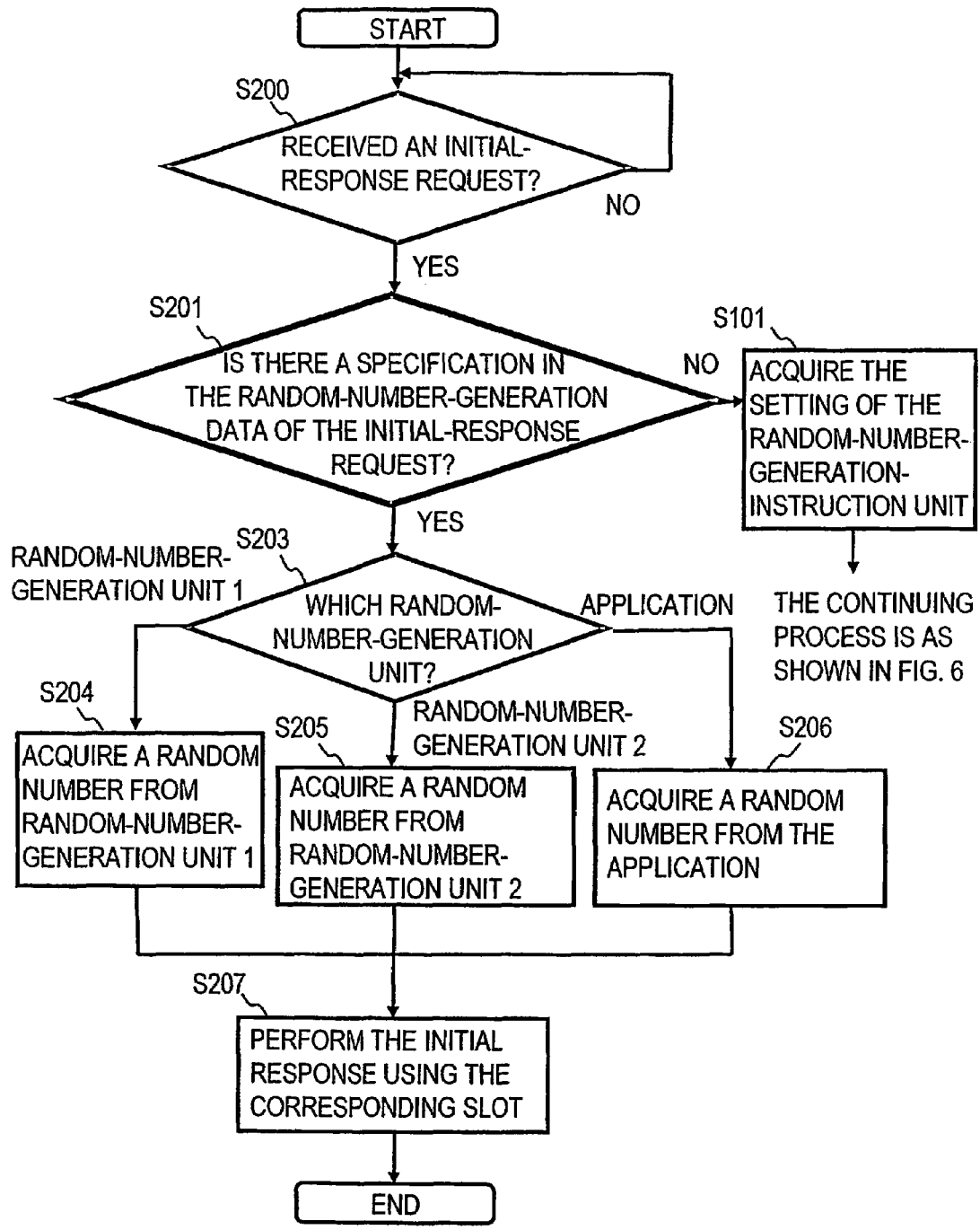
FIG. 9 is a flowchart showing the processing of the contactless IC card of a second embodiment of the invention.

FIG. 9 is a flowchart showing the operation of the contactless IC card 250.

First, the contactless IC card 250 waits for an initial-response request to be sent from the reader/writer 100 (step S200: NO). When an initial-response request is received (step S200: YES), the slot-setting unit 700 calculates the number of slots based on the request (not shown in the figure). The number of slots (N) calculated here is taken to be 2. Furthermore, the random-number-generation-data-acquisition unit 207 acquires random-number-generation data from the initial-response request. The random-number-generation data is given by the three bits 307 (bit 6 to bit 8) of PARAM 302 shown in FIG. 3, and is data that designates which random-number-generation unit is to be used for the response.

Here, when there is a designation for the random-number-generation unit in the acquired random-number-generation data (bit 6 to bit 8 is something other than 0), the process advances to step S203 (step S201: YES), and when there is no designation (bit 6 to bit 8 is 0), the process goes to step S101 (step S201: NO). Step S101 is step S101 in FIG. 7 showing the first embodiment, and when there is no specification, the contactless IC card 250 acquires the setting from the random-number-generation-instruction unit 206. After that, generation of a random number based on the acquired setting and responding to the request is the same as in the first embodiment.

When the random-number-generation data in the initial-response request indicates random-number-generation unit 1, the slot-setting unit 214 acquires a random number from the random-number-generation unit 1 (211) (step S204).

When the random-number-generation data indicates random-number-generation unit 2, the slot-setting unit 214 acquires a random number from the random-number-generation unit 2 (212) (step S205).

After that, the slot-setting unit 700 sets the slot to be used for the response based on the acquired random number, and uses that slot to respond to the request (step S207).

As described above, by having the contactless IC card judge the random-number-generation data contained in the initial-response request, it becomes possible for the reader/writer to designate the random-number-generation unit, or in other words, to designate the method of generating the random number. In this way, it is possible for the external host program (reader/writer) to have the contactless IC card perform the desired random-number generation, so a different slot can be set for each contactless IC card, and thus it is possible to prevent collisions between responses to a request.

When the random-number-generation data indicates an application, the slot-setting unit 700 performs a random-number-generation request to the application 701 stored in the RAM 205, and acquires a random number from the unique random-number-generation function 703 of that application (step S206). The random-number-generation function 703 is one form of a random-number generation unit.

Next, the slot-setting unit 700 sets the slot to be used for the response based on the acquired random number, and uses that slot to respond to the request (step S207).

Of course, when the contactless IC card has a plurality of applications 701, 702, 705, the reader/writer can store the application ID that designates the application as the random-number-generation data for example. Based on the application ID, the random-number-generation-data-acquisition unit 207 acquires a random number from the unique random-number-generation function 704 of the corresponding application. It is also possible for the application itself to have a random-number-generation unit, or as in the case of other applications, it is also possible to download from the outside.

As described above, the random-number-generation data designates an application, and by having the random-number-generation-data-acquisition unit acquire that random-number-generation data, it is possible for the reader/writer to generate unique random numbers for the applications on the contactless IC card, and to select different slots for each application. Therefore, as in the case of the long-term commuter-pass and normal ticket contactless IC cards described above, by identifying one of the contactless IC cards, it is not necessary to identify the other cards, so it is possible to end early the process for identifying the contactless IC cards.

(Third Embodiment)

Figure 10A:
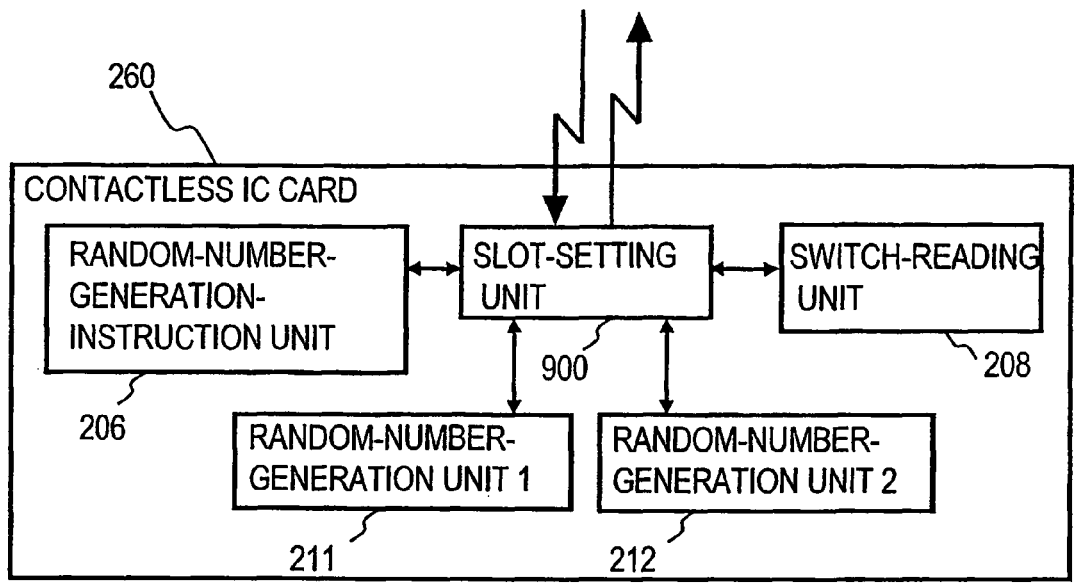
FIG. 10A is a block diagram showing the function of the contactless IC card of a third embodiment of the invention.
Figure 10B:
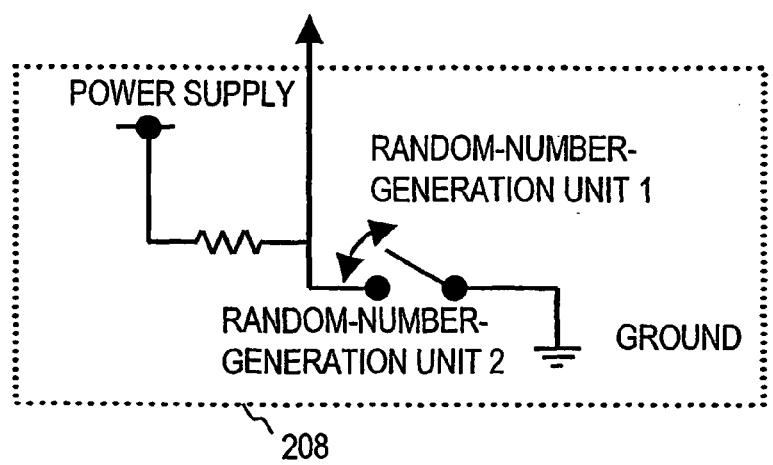
FIG. 10B is a drawing showing an example of the switch means.

FIG. 10A is a block diagram showing the function of the contactless IC card 260 of a third embodiment of the invention, and FIG. 10B is a drawing showing an example of the switch unit. The reader/writer 100 is the same as the reader/writer described in the first embodiment so an explanation of it will be omitted here.

The contactless IC card 260 is constructed such that it has a switch-reading unit 208 in addition to the construction of the contactless IC card 200. The switch-reading unit 208 changes the signal sent to the CPU 203 between the switch OFF state and switch ON state. Depending on the signal that is sent, the CPU 203 selects either random-number-generation unit 1 or random-number-generation unit 2. Here, when the switch is OFF, the signal sent to the CPU 203 is plus voltage, and in that case, random-number-generation unit 1 (211) is selected, and when the switch is ON, the signal sent to the CPU 203 is zero voltage, and in that case, random-number-generation unit 2 (212) is selected. In this explanation, construction is such that the random-number-generation unit is selected by the change in voltage to the CPU 203; however, the construction could be something other than the change of voltage as long as judgment by the CPU 203 is possible.

Figure 11:
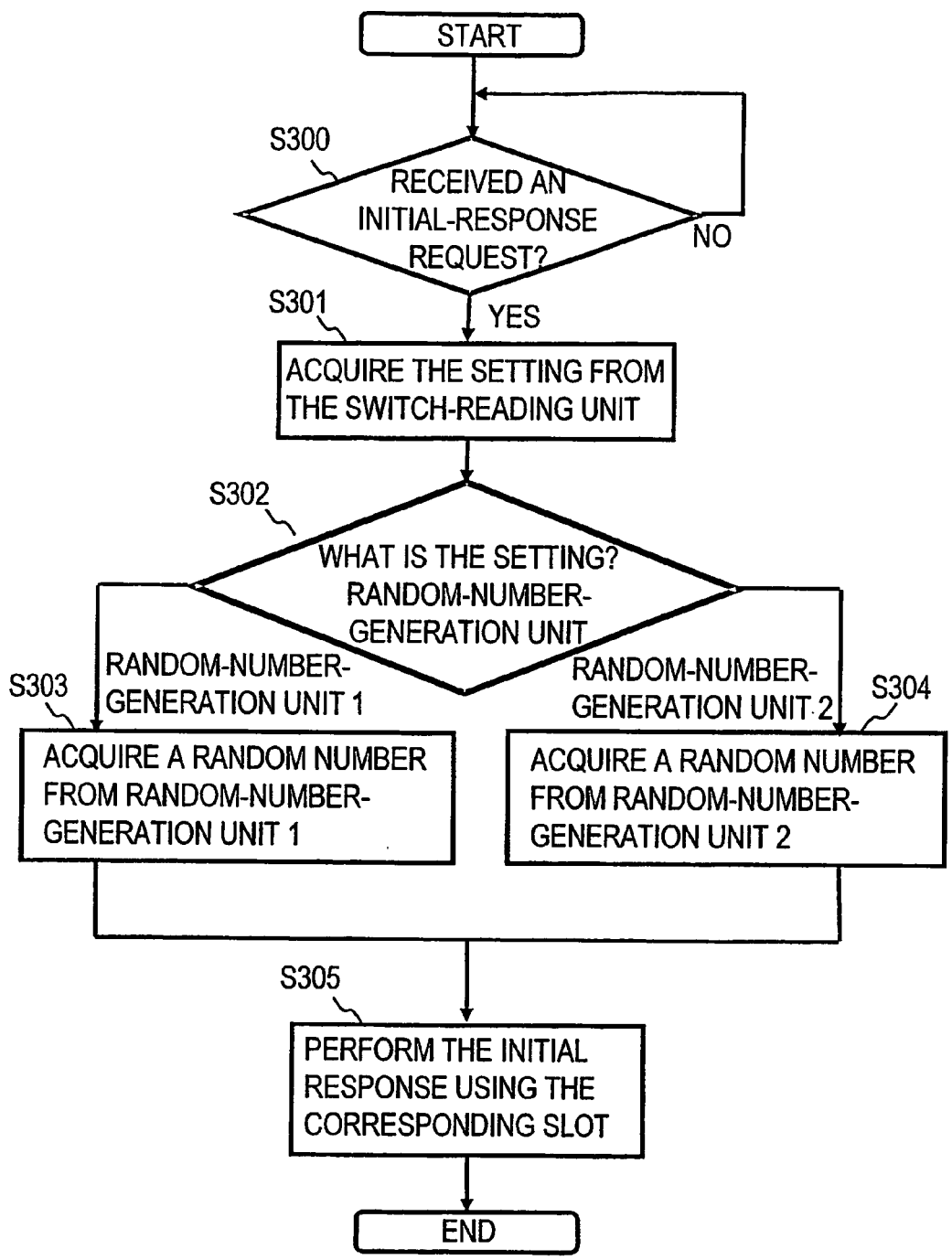
FIG. 11 is a flowchart showing the processing of the contactless IC card of a third embodiment of the invention.

FIG. 11 is a flowchart showing the operation of the contactless IC card 260.

First, the contactless IC card 260 waits for an initial-response request from the reader/writer 100 (step S300: NO). When the initial-response request is received (step S300: YES), the slot-setting unit 900 calculates the number of slots based on that initial-response request (omitted in the figure). Here, the number of slots (N) is 2.

Next, the slot-setting unit 900 acquires the setting from the switch-reading unit 208 (step S301). The slot-setting unit 900 then sets the random-number-generation unit that will be used based on the acquired setting.

When the setting is OFF, the random number is acquired from random-number-generation unit 1 (211) (step S303).

When the setting is ON, the random number is acquired from random-number-generation unit 2 (212) (step S304).

After that, the initial response is performed using the slot number according to the acquired random number (step S305).

As described above, it is possible for the user of the contactless IC card to select the method for acquiring the random number by a switch from the outside, so it is possible to select a method for generating the random number that is suitable to the conditions for using the contactless IC card, and thus it is possible to prevent collisions between responses to a request.

It is also possible to switch the default application described above based on the state of the switch. Construction of setting the random-number-generation unit by setting the default application in the latter part of the process of the first embodiment described above has the same effect as setting the random-number-generation unit with a switch.

INDUSTRIAL APPLICABILITY

The contactless IC card of this invention is capable of reducing the possibility of collisions between responses, so this invention is effective in the case of a contactless IC card that is used in a system that identifies a plurality of contactless IC cards.

The invention claimed is:

1. A contactless IC card configured for executing a plurality of applications and responds to a request from a reader/writer using a slot that was set by a random number, and comprising:

a plurality of random-number-generation units that are separate from the applications, and operable to independently generate a random number for setting the slot;

a random-number-generation-instruction unit operable to designate the random-number-generation unit to be used for a response to the request from among the plurality of random-number-generation units; and a slot-setting unit operable to use the random number generated by the random-number-generation unit that was designated by the random-number-generation-instruction unit and perform the response.

2. The contactless IC card of claim 1 wherein
the random-number-generation-instruction unit designates the random-number-generation unit to be used for the response based on an application from among a plurality of applications stored on the contactless IC card that is set by specified data.

3. The contactless IC card of claim 2 further comprising
a random-number-generation-data-acquisition unit operable to acquire random-number-generation data that is contained in the request and that designates the random-number-generation unit; and wherein
the slot-setting unit uses the random-number-generation unit that is designated by the random-number-generation data to acquire a random number, and use that random number to perform the response.

4. The contactless IC card of claim 3 wherein the random-number-generation data designates an application that is stored on the contactless IC card; and
the slot-setting unit uses a function provided in the application designated by the random-number-generation data to acquire a random number, and use that random number to perform the response.

5. The contactless IC card of claim 2 wherein
the application can be downloaded through communication and that application comprises the random-number-generation unit.

6. The contactless IC card of claim 1 wherein
the random-number-generation-instruction unit changes a designation of the random-number-generation unit based on an instruction from the reader/writer.

7. The contactless IC card of claim 1 further comprising
a switch that is operable to physically select the plurality of random-number-generation units; and wherein
the slot-setting unit selects the random-number-generation unit based on the status of the switch, and use the random number generated by selected random-number-generation unit to perform the response.

8. The contactless IC card of claim 1 further comprising
a random-number-generation-notification unit operable to store data, which indicates the random-number-generation unit that was used for the response, in the response; and wherein
the slot-setting unit sends the response storing the data to the reader/writer.

\* \* \* \* \*